Mar. 20, 1923.

VICTOR GRAF v. ALTEN 1,449,205

WORM GEARING

Filed Aug. 25, 1921    3 sheets-sheet 1

Inventor:
Victor Graf von Alten
By Lotka, Kehlenbeck & Mathé
Attorneys.

Patented Mar. 20, 1923.

1,449,205

UNITED STATES PATENT OFFICE.

VICTOR GRAF v. ALTEN, OF BERLIN-WILMERSDORF, GERMANY.

WORM GEARING.

Application filed August 25, 1921. Serial No. 495,208.

*To all whom it may concern:*

Be it known that I, VICTOR GRAF VON ALTEN, a citizen of the German Republic, residing in Berlin-Wilmersdorf, Germany, have invented certain new and useful Improvements in Worm Gearing (for which I have filed applications in Germany, June 1st, 1920; Great Britain, May 30, 1921; France, May 31, 1921; Belgium, May 30, 1921; Italy, May 31, 1921; Austria, May 31, 1921; and Czechoslovakia, May 30, 1921), of which the following is a specification.

It has previously been proposed in worm and wormwheel gearing to use balls as a transmitting medium and to arrange them in sockets or spherical recesses or grooves on the periphery of the wheel, retaining them in position by a concentric guide, lateral projections or other suitable appliances.

As to relieve the driving strain it is desirable that more than one ball preferably four should always simultaneously engage the worm, the balls being arranged on the periphery of the wheel, it becomes necessary to give the worm a globoidal thread, the correct machining of which requires special tools and is very expensive. It is known that worm gearing for high velocity for which bronze worm wheels are generally in use gets worn in a comparatively short time and then loses the high mechanical efficiency it had when new. The abnormal wear of such gearing running at high speed such as used in motor cars or electric power transmission, the impossibility of recutting or readjusting the teeth and worm thread, the necessity of frequently renewing the expensive bronze worm wheel have caused this type of gearing recently to lose much of its one-time vogue in the motor-car industry. The same disadvantages found in tooth worm gearing also militate against the variety that carries balls on the periphery of the worm wheel and requires a globoidal worm.

My invention relates to an improved self-adjusting worm gear employing balls or rollers as a transmitting medium. It is free from the above mentioned disadvantages. Gliding friction is reduced to a minimum being substituted almost throughout by rolling friction. The worm itself has a cylindrical thread with uniform pitch.

Even a fair amount of wear of the elements will not unfavorably influence its high mechanical efficiency as accurate gearing of the worm with the balls or rollers and through these with the driven wheel is permanently ensured. The working of the gear will be noiseless.

Figure 1:
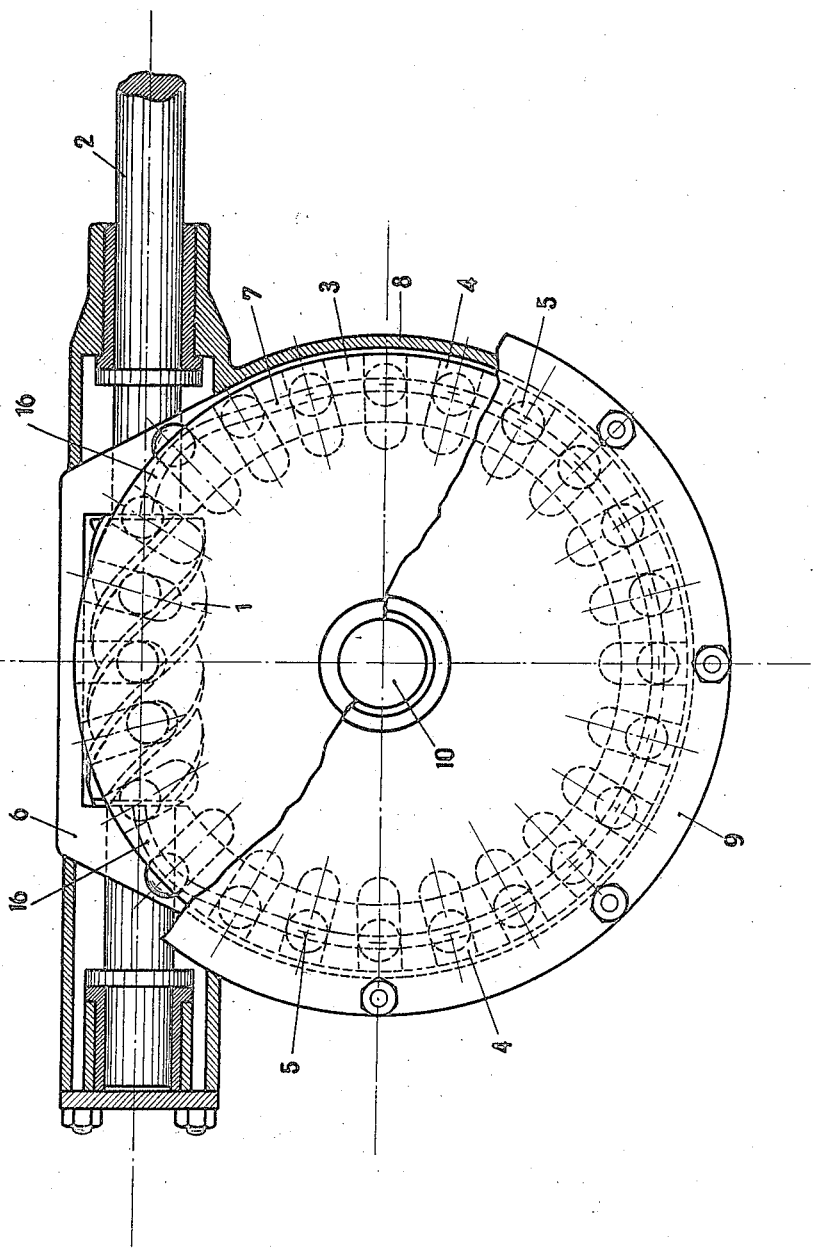
Figure 2:
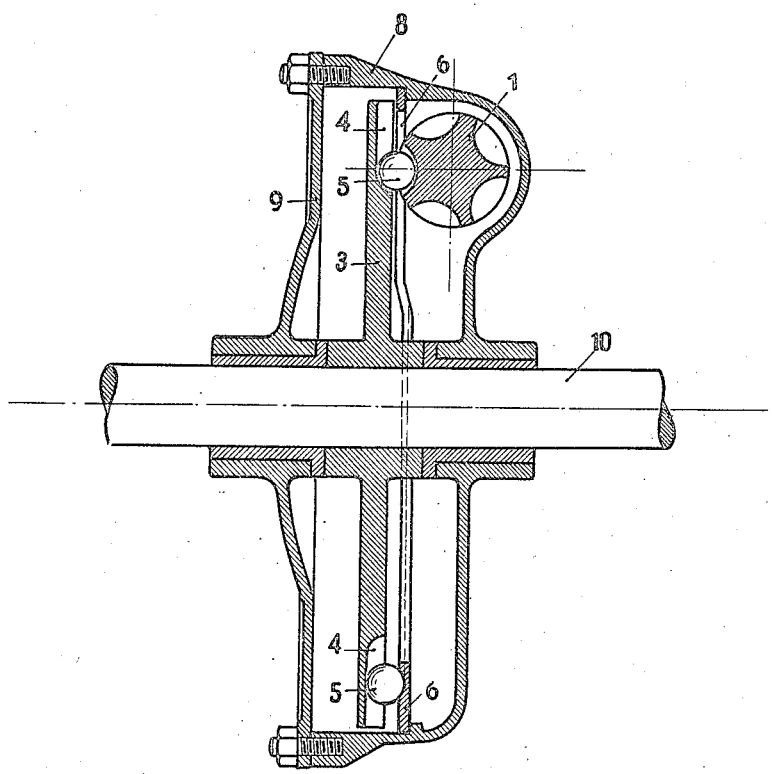
Figure 3:
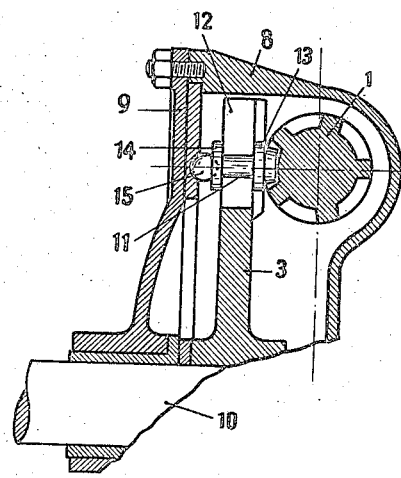

In the accompanying drawings Figure 1 shows a side elevation with a longitudinal section through the casing along the middle line of the worm shaft, the end cover of the outside chamber being partly removed. Figure 2 is a cross section through the gear and Figure 3 illustrates a partial cross section of a constructional form with rollers.

The gear according to the invention comprises a worm 1 with shaft 2 revolving on the face of a disc 3 keyed to shaft 10, said disc having radial grooves 4 in which balls 5 move freely, a stationary ballrace 6 with a ball path 7 which has a gap for the worm and is curved eccentrically at the points, where the balls enter and leave the worm, an outside casing 8 with end cover 9. Not to collide with the thread of the revolving worm it is important to give the curves a suitable shape as shown at 16 so as to let the ball pass into the worm thread as nearly as possible in a line with the axis of the worm. That is to say, the inner extremities of the eccentric portions 16 are substantially in line with each other and tangential to the dot-and-dash line which in Fig. 1 indicates the center or axis of the shaft 2. The major part of the ball path should preferably be circular.

The action of the gear is as follows:

The balls that are not in gear with the worm are guided by the ball path 7 until they pass without shock into the thread of the worm, the position of each ball in its respective groove is determined by the worm thread which embraces half of its circumference and pushes it towards the centre of the driven wheel. The ball thus moves in the direction of the middle line of the worm, adjusting itself as shown on the drawing. The dotted lines which limit the worm thread and the guide grooves form two pairs of tangents to the circumference of the ball. For each angle of revolution of the driven disc the position of the balls is accurately determined by these intersecting tangents. The angle between the guide grooves and the worm thread varying during the progress of the ball along the worm, the ball does not move exactly parallel to the middle line of the worm but the deviation is very slight as can be seen on the drawing and of no importance in practice.

In the arrangement illustrated at least four balls out of twenty four are in gear with the worm thread at all times, each ball automatically adjusting itself so as to remain always in close contact both with the worm thread and its guide groove. This selfadjusting feature of the gear will cause it to run noiselessly and without increased loss of power even when worn. A wear that would be prohibitive in tooth worm gearing of any variety using globoidal worm will not affect the new worm gear, and friction being reduced to its possible minimum it will outlive any known form of worm gearing.

The guide grooves that should preferably be radially directed may also be arranged to run at a slight angle to the radius provided the selfadjusting action is not interfered with. The angle will have to be chosen so as to ensure the balls travelling as closely as possible parallel to the middle line of the worm, this being a chord of the mathematical pitchline on the driven disc.

Instead of using balls as transmitting members rollers can advantageously be employed especially for high power gearing, the driving strain being considerably diminished by the increase of contact surface.

As illustrated in Figure 3 the rollers 11 run in slots 12 in the driven disc. They are fitted with flanges 13 and 14 to prevent adging and jamming. The thread of the worm is cut in accordance with the shape of the roller. The rollers having to be guided in the same way and on the same cam curve as the balls; a stationary race or grooved cam ring 15 with a path curved like the path 7 of Fig. 1 and arranged in a continuous curve behind the disc. Flange 14 has a socket to hold the ball 15 that running on the ball path guides the roller in its slot. Instead of using a ball to guide the roller, the flange may be made to carry a cylindrical or rounded cam to fit in an appropriately shaped groove in the cam ring.

Having now described my invention, what I claim as new and desire to secure by Letters Patent is:

1. In worm gearing having intermediate members as transmitting medium the combination with a worm, of a disc revolving with its face against the worm, guides arranged in said disc, intermediate members movable freely in said guides and gearing with the worm and adapting themselves to its thread thereby being pushed in their guides towards the centre of the disc.

2. In worm gearing having intermediate members as transmitting medium the combination with a worm, of a disc revolving with its face against the worm, guide grooves in said disc arranged radially, balls movable freely in the grooves and gearing with the worm and adapting themselves to its thread thereby being pushed in their grooves towards the centre of the disc, a ball race facing the disc and leaving a gap for the worm and having a path partly eccentrically curved so as to guide the balls to engage the worm parallel to its axis.

3. Worm gearing comprising a worm, a revolving disc having its face adjacent to the worm, revolving members mounted to rotate in unison with said disc but movable individually relatively thereto toward and from the axis of the disk, and a stationary race or track engaging said revolving members, the latter being adapted to mesh with said worm, and said stationary track having a gap adjacent to the meshing portion of the worm.

4. Worm gearing comprising a worm, a revolving disc having its face adjacent to the worm, transmission members carried by said disc to rotate in unison therewith but rotatable individually relatively to such disc and also movable individually relatively thereto toward and from the axis of the disc, and a stationary track engaging said revolving members, the latter being adapted to mesh with said worm, and said track having a gap adjacent to the meshing portion of the worm, the ends of the track at said gap, being in substantial alignment with each other and parallel to the axis of the worm.

In testimony whereof I affix my signature.

VICTOR GRAF v. ALTEN.

Witnesses:
 GRAF FRANZ MONTGELES,
 Dr. PAUL COMAR.